United States Patent [19]

Hongo et al.

[11] Patent Number: 5,346,952
[45] Date of Patent: Sep. 13, 1994

[54] BLENDS OF POLYPHENYLENE ETHER, AROMATIC VINYL RESINS AND VINYL AROMATIC-VINYL HETEROCYCLIC MONOMER GRAFTED BUTADIENE BASED POLYMERS

[75] Inventors: Masafumi Hongo; Hideki Yano; Hideyuki Shigemitsu, all of Otake, Japan

[73] Assignee: Mitsubishi Rayon Company Ltd., Tokyo, Japan

[21] Appl. No.: 54,838

[22] Filed: Apr. 30, 1993

Related U.S. Application Data

[63] Continuation of Ser. No. 837,703, Feb. 20, 1993, abandoned, which is a continuation of Ser. No. 526,736, May 22, 1990, abandoned.

[30] Foreign Application Priority Data

May 23, 1989 [JP] Japan .................. 1-129385
Aug. 9, 1989 [JP] Japan .................. 1-204601

[51] Int. Cl.$^5$ .................. C08L 39/04; C08L 51/04; C08L 71/12
[52] U.S. Cl. .................. 525/68; 525/133; 525/905
[58] Field of Search .................. 525/68, 905, 133

[56] References Cited

U.S. PATENT DOCUMENTS

| | | | |
|---|---|---|---|
| 3,849,172 | 11/1974 | Chin et al. | 525/203 |
| 3,976,725 | 8/1976 | Lee, Jr. | 525/68 |
| 4,128,602 | 12/1978 | Katchman et al. | 525/68 |
| 4,128,603 | 12/1978 | Katchman et al. | 525/68 |
| 4,513,120 | 4/1985 | Bennett, Jr. et al. | 525/68 |
| 4,528,327 | 7/1985 | Cooper et al. | 525/68 |
| 4,816,515 | 3/1989 | Weiss | 525/68 |
| 5,143,955 | 9/1992 | Kendall | 525/68 |

FOREIGN PATENT DOCUMENTS

| | | |
|---|---|---|
| 44703 | 1/1982 | European Pat. Off. . |
| 164048 | 12/1985 | European Pat. Off. . |
| 259677 | 3/1988 | European Pat. Off. . |
| 285969 | 10/1988 | European Pat. Off. . |

*Primary Examiner*—James J. Seidleck
*Assistant Examiner*—Thomas Hamilton, III
*Attorney, Agent, or Firm*—Armstrong, Westerman, Hattori, McLeland & Naughton

[57] ABSTRACT

Disclosed is a thermoplastic resin composition comprised of (A) 10–60 weight parts of a polyphenylene ether resin, (B) 20–70 weight parts of (b-1) an aromatic vinyl resin and/or (b-2) a copolymer of an aromatic vinyl monomer with a heterocyclic compound having a vinyl group and containing nitrogen as the hetero atom and (C) 10–60 weight parts of (c-1) a graft copolymer obtained by polymerizing an aromatic vinyl monomer, optionally with other vinyl monomer, in the presence of a butadiene type rubbery polymer or (c-2) a graft copolymer obtained by polymerizing an aromatic vinyl monomer and a heterocyclic compound having a vinyl group and containing nitrogen as the hereto atom, optionally with other ethylenically unsaturated compound, in the presence of a butadiene type rubbery polymer, wherein at least one of the components (B) and (C) is a polymer of the nitrogen-containing heterocyclic compound, and the total amount of the components (A), (B) and (C) is 100 parts by weight.

11 Claims, No Drawings

BLENDS OF POLYPHENYLENE ETHER, AROMATIC VINYL RESINS AND VINYL AROMATIC-VINYL HETEROCYCLIC MONOMER GRAFTED BUTADIENE BASED POLYMERS

This application is a continuation of application Ser. No. 07/837,703, filed Feb. 20, 1993, now abandoned, which is a continuation of Ser. No. 07/526,736, filed May 22, 1990, now abandoned.

BACKGROUND OF THE INVENTION

(1) Field of the Invention

The present invention relates to a thermoplastic resin composition having a superior heat resistance, impact resistance and plating properties. More particularly, it relates to a thermoplastic polyphenylene ether resin composition having such properties.

(2) Description of the Related Art

The polyphenylene ether resin has a superior heat resistance, mechanical properties, and electrical properties, and good properties such as a low water absorption and high dimensional stability. Although this resin has a poor molding processability and impact resistance, these defects are overcome by blending a rubber-reinforced resin such as rubber-reinforced high-impact polystyrene, and such blends are currently widely used.

Almost all polyphenylene ether resin compositions used in the field of plating are formed by blending a polyphenylene ether resin with an ABS resin. Unlike high-impact polystyrene, the ABS resin (AS resin) has a poor compatibility with the polyphenylene ether resin, and therefore, lamellar peeling occurs in the blend.

As the means for overcoming this defect, Japanese Unexamined Patent Publication No. 53-154754 and Japanese Examined Patent Publication No. 63-7580 propose a method comprising blending an AS resin having a low acrylonitrile content with a polyphenylene ether resin, but even according to this proposal, a composition having not only satisfactory plating properties (such as throwing power and adhesion strength) but also impact resistance cannot be obtained.

It has been considered that, to plate a composition by the plating process for ABS resins a vinyl cyanide monomer should be present in the composition, but a copolymer of the vinyl cyanide monomer and an aromatic vinyl monomer or a graft copolymer obtained by grafting the vinyl cyanide monomer and an aromatic vinyl monomer to a rubbery polymer has a poor compatibility with the polyphenylene ether resin, and therefore, lamellar peeling occurs in the blend or the physical properties are lowered.

SUMMARY OF THE INVENTION

Under the above-mentioned background, the primary object of the present invention is to provide a polyphenylene ether resin composition having a superior heat resistance, impact resistance, and molding processability, capable of being plated by a broadly adopted plating process for ABS resins without using a special plating process heretofore used exclusively for polyphenylene ether resins, and having good plating properties.

As a result of detailed research, the inventors found that if a copolymer of an aromatic vinyl monomer with a heterocyclic compound having a vinyl group and containing nitrogen as the hetero atom is incorporated, together with a graft copolymer obtained by polymerizing an aromatic vinyl monomer, optionally with other vinyl monomer copolymerizable therewith, in the presence of a butadiene type rubbery polymer, into a polyphenylene ether resin, little lamellar peeling or reduction of the physical properties occurs and the plating properties are greatly improved.

More specifically, in accordance with the present invention, there is provided a thermoplastic resin composition comprising (A) 10 to 60 parts by weight of a polyphenylene ether resin, (B) 20 to 70 parts by weight of at least one member selected from the group consisting of (b-1) an aromatic vinyl resin and (b-2) a copolymer of an aromatic vinyl monomer with a heterocyclic compound having a vinyl group and containing nitrogen as the hetero atom, and (C) 10 to 60 parts by weight of at least one member selected from the group consisting of (c-1) a graft copolymer obtained by polymerizing an aromatic vinyl monomer, optionally with other vinyl monomer copolymerizable therewith, in the presence of a butadiene type rubbery polymer and (c-2) a graft copolymer obtained by polymerizing an aromatic vinyl monomer and a heterocyclic compound having a vinyl group and containing nitrogen as the hetero atom, optionally with other ethylenically unsaturated compound copolymerizable therewith, in the presence of a butadiene type rubbery polymer, wherein at least one of the components (B) and (C) is a polymer of the nitrogen-containing heterocyclic compound, and the total amount of the components (A), (B) and (C) is 100 parts by weight.

DESCRIPTION OF THE PREFERRED EMBODIMENTS

In the present invention, as the polyphenylene ether resin (A), there can be used a polymer having recurring units represented by the following general formula (I):

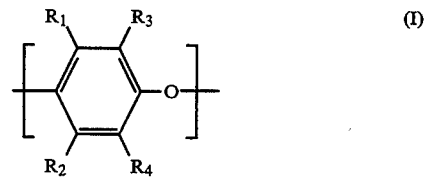

wherein $R_1$, $R_2$, $R_3$ and $R_4$, which may be the same or different, represent an alkyl group having 1 to 4 carbon atoms, excluding a tert.-butyl group, an aryl group having 6 to 10 carbon atoms, a halogen atom, a hydrogen atom, a nitro group or an amino group,
and a styrene-grafted polyphenylene ether.

Typical examples of the polyphenylene ether homopolymer include poly(2,6-dimethyl-1,4-phenylene) ether, poly(2-methyl-6-ethyl-1,4-phenylene) ether, poly(2,6-diethyl-1,4-phenylene) ether, poly(2-methyl-6-chloro-1,4-phenylene) ether, poly(2-methyl-6-hydroxyethyl-1,4-phenylene) ether, and poly(2-methyl-6-chloroethyl-1,4-phenylene) ether.

The amount of the polyphenylene ether resin (A) incorporated is 10 to 60 parts by weight, preferably 20 to 45 parts by weight, per 100 parts by weight of the sum of the three components (A), (B) and (C). If the amount of the polyphenylene ether resin is smaller than 10 parts by weight, the heat resistance is lowered, and if the amount of the polyphenylene ether is larger than 60 parts by weight, the moldability and plating properties become poor.

The aromatic vinyl resin (b-1) used as a component (B) is a polymer having recurring units represented by the following formula (II)

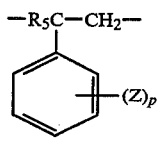

$$-R_5C-CH_2-\phantom{xxx}(Z)_p \quad (II)$$

wherein $R_5$ represents a hydrogen atom or an alkyl group having 1 to 4 carbon atoms, Z represents a hydrogen atom, a halogen atom or an alkyl group having 1 to 4 carbon atoms, and p is an integer of from 1 to 5.

As typical instances, there can be mentioned homopolymers and copolymers of styrene, α-methylstyrene, vinyltoluene, vinylethylbenzene, vinylxylene, tert.-butylstyrene and chlorostyrene. Furthermore, rubber-reinforced high-impact polystyrene can be mentioned. Of the foregoing resins, polystyrene and high-impact polystyrene are preferably used.

As the aromatic vinyl monomer used for the copolymer (b-2) as a component (B) of the present invention, there can be mentioned aromatic vinyl monomers providing a polymer having recurring units represented by the above formula (II), which include, for example, styrene, α-methylstyrene, chlorostyrene and vinyltoluene.

As the heterocyclic compound having a vinyl group and containing nitrogen as the hetero atom for the copolymer (b-2), there can be mentioned vinylpyridine, vinylimidazole, vinylquinoline, and vinylpyrazine. Vinylpyridine is most preferably used. The copolymerization ratio of the aromatic vinyl monomer to the heterocyclic compound is preferably from 95/5 to 65/35 by weight.

Copolymerizable vinyl monomers other than acrylonitrile can be further copolymerized with the aromatic vinyl monomer and the heterocyclic compound according to need.

The amount of the component (B) incorporated is 20 to 70 parts by weight and preferably 30 to 60 parts by weight per 100 parts by weight of the sum of the three components (A), (B), and (C). If the amount of the component (B) is smaller than 20 parts by weight, the moldability becomes poor, and if the amount of the component (B) is larger than 70 parts by weight, the heat resistance is lowered.

The amount of the copolymer (b-2) per 100 parts by weight of the thermoplastic resin composition depends on the amount of the copolymer (c-2), but when the thermoplastic resin composition not containing the copolymer (c-2), if the amount of the copolymer (b-2) is smaller than 20 parts by weight, the throwing power at the plating step is degraded.

A butadiene copolymer comprising at least 50% by weight of butadiene and not more than 50% by weight of an ethylenically unsaturated monomer such as an acrylic acid ester, styrene, or acrylonitrile, or an organosiloxane is used as the butadiene type rubbery polymer for the preparation of the graft copolymer (C) of the present invention. As typical instances, there can be mentioned polybutadiene, a styrene/butadiene copolymer, and a butadiene/butyl acrylate composite copolymer.

The amount of the rubbery polypher in the graft copolymer is not particularly critical, but preferably, the amount of the rubbery polymer is at least 30% by weight based on the weight of the graft copolymer (C). If the amount of the rubbery polymer is smaller than 30% by weight, the proportion of the aromatic vinyl polymer is increased and the heat resistance of the composition becomes lower.

As the aromatic vinyl monomer used for the preparation of the graft copolymers (c-1) and (c-2), there can be mentioned aromatic vinyl monomers providing a polymer having recurring units represented by the above formula (II), which include, for example, styrene and α-methylstyrene. As the copolymerizable ethylenically unsaturated monomer, there can be mentioned methacrylic acid esters such as methyl methacrylate and ethyl methacrylate, acrylic acid esters such as methyl acrylate, ethyl acrylate, and butyl acrylate, maleimide derivatives such as N-phenylmaleimide and N-cyclohexylmaleimide, and vinyl group-containing nitrogen bases such as vinylpyridine, vinylimidazole, acrylamide, and methacrylamide.

As the heterocyclic compound having a vinyl group and containing nitrogen as the hetero atom, which is used as the monomer to be grafted for the preparation of the copolymer (c-2) in the present invention, there can be mentioned 2-vinylpyridine, 4-vinylpyridine, vinylimidazole, vinylquinoline, and vinylpyrazine. Among the above, vinylpyridine is most preferably used.

If the amount of the above-mentioned vinyl group-containing heterocyclic compound used for the graft polymerization is smaller than 10% by weight based on all of the monomers used for the grafting, the throwing power at the plating step is poor, and if the amount of this monomer is larger than 50% by weight, the impact resistance is lowered. If the amount of the aromatic vinyl monomer is smaller than 30% by weight based on all of the monomers used for grafting, the moldability and impact resistance become poor, and if the amount of the aromatic vinyl monomer is larger than 90% by weight, the throwing power at the plating step is lowered.

The graft copolymer (C) used in the present invention can be prepared by any of emulsion polymerization, suspension polymerization, and bulk polymerization.

The graft polymerization can be conducted in one stage or in a plurality of stages. Especially, if a process is adopted in which the monomer containing a nitrogen base, which is necessary for improving the throwing power at the plating step, is polymerized at the first stage and the aromatic vinyl monomer having a particularly good compatibility with the polyphenylene ether is polymerized at the second stage, the throwing power at the plating step is improved, and furthermore, the compatibility of the graft copolymer (C) with the polyphenylene ether (A) and the aromatic vinyl resin is further improved. In this case, moreover, a composition having a superior impact resistance and plating properties to those of the composition comprising the copolymer obtained by one-stage graft polymerization is obtained.

The amount of the graft copolymer (C) incorporated is 10 to 60 parts by weight, preferably 15 to 50 parts by weight, per 100 parts by weight of the thermoplastic resin composition of the present invention. If the amount of the graft copolymer (C) incorporated is smaller than 10 parts by weight, the plating properties and impact resistance become poor, and if the amount of the graft copolymer (C) is larger than 60 parts by weight, the heat resistance is lowered. Especially, in the case of the thermoplastic resin composition free of the copolymer (b-2), if the amount of the copolymer (c-2) incorporated is smaller than 10% by weight, the throwing power at the plating step is lowered.

Any known process can be used for the preparation of the composition of the present invention, and preferably a process is adopted in which the components (A) through (C) are preliminarily weighed and mixed and the mixture is melt-kneaded by a single-screw or twin-screw extruder. A phenol type stabilizer, a phosphorus or halogen type flame retardant, a known foaming agent, a dye or pigment, and a fibrous, spherical, scaly or indeterminate filler can be incorporated into the composition of the present invention according to need.

The present invention will now be described in detail with reference to the following examples.

In the following examples and comparative examples, all of "parts" and "%" are by weight.

The tests were carried out according to the following methods.

(1) Izod impact strength

Notched test piece having a thickness of ¼ inch, ASTM D-256 (kg·cm/cm)

(2) HDT (° C.)

Thickness of ¼ inch, load of 18 6 kg/cm$^2$, ASTM D-648

(3) Plating adhesion strength (kg/cm)

A plate (5.0 mm×8.0 mm×0.3 mm) molded at a mold temperature of 80° C., a minimum injection rate and a cylinder temperature of 270° C. (resin temperature =278° C.) was plated under conditions described below. A notch with a width of 2.5 cm was formed in the formed plating film, and the force required for peeling the film by pulling the film in the vertical direction was determined and converted to a value per cm of the width. The obtained value was designated as the adhesion strength.

(5) Throwing power at plating step

The sample was immersed in an electroless nickel plating solution for 5 minutes, and the throwing power was evaluated. The mark "A" indicates the case where the metal was deposited on the entire surface of the molded article, the mark "B" indicates the case where the metal was partially deposited, and the mark "C" indicates the case where the metal was not deposited at all.

Plating conditions

Cleaning with surfactant: 60° C., 15 minutes

Etching (CrO$_3$ 400 g/l, H$_2$SO$_4$ 200 ml/l): 60° C., 15 minutes Acid treatment (HCl, 10% by volume): room temperature, 1 minute Catalyzer (Catalyst A-30 supplied by Okuno Seiyaku): 20° C., 2 minutes Accelerator (H$_2$SO$_4$ , 10% by volume): 40° C., 3 minutes Electroless nickel plating (TMP Chemical Nickel supplied by Okuno Seiyaku): 35° C., 5 minutes Electric copper plating (copper sulfate 200 g/l, H$_2$SO$_4$ 50 g/l, brightening agent): 20° C., current density of 4 A/dm$^2$, 60 minutes Baking: 80° C., 2 hours Samples were plated under the above conditions customarily adopted for ABS resins and naturally cooled for 1 hour, and the adhesion strength then measured.

(1) Preparation of copolymer (b-2-I)

To 200 parts of distilled water were added 2.0 parts of a sodium dodecylbenzene-sulfonate emulsifier, 0.5 part of Rongalit, 0.003 part of ferrous sulfate, and 0.01 part of disodium ethylenediamine-tetraacetate, the temperature was elevated to 60° C., and a mixture of 90 parts of styrene, 10 parts of 2-vinylpyridine, 0.4 part of cumene hydroperoxide, and 0.1 part of tert-dodecylmercaptan was continuously added dropwise over a period of 120 minutes. After termination of the dropwise addition, the temperature was elevated to 70° C., the mixture was maintained at this temperature for 1 hour, and the reaction mixture then cooled.

The obtained latex was coagulated with magnesium sulfate, washed, filtered, and dried.

(2) Preparation of copolymers (b-2-II) through (b-2-IV)

These copolymers were prepared in the same manner as adopted for the preparation of the copolymer (b-2-I) except that the monomer composition was changed as shown in Table 1.

(3) Preparation of graft copolymer (c-1-I)

To 70 parts (as solids) of a polybutadiene latex having a solid content of 33% and an average particle diameter of 0.08 μm was added 2 parts of a copolymer latex having an average particle diameter of 0.08 μm and comprising 85% of n-butyl acrylate units and 15% of methacrylic acid units, with stirring, and the mixture was stirred for 30 minutes to obtain an agglomerated rubber latex having an average particle diameter of 0.28 μm. Then 50 parts of distilled water, 2.0 parts of a potassium oleate emulsifier, 0.2 part of a naphthalene-sulfonic acid/formalin condensate (Demol N supplied by Kao), 0.02 part of sodium hydroxide, and 0.35 part of dextrose were added, with stirring, to the obtained agglomerated latex, the temperature was elevated, and at an inner temperature of 70° C., 0.05 part of ferrous sulfate, 0.2 part of sodium pyrophosphate, and 0.03 part of sodium dithionite were added to the mixture. Immediately, a liquid mixture comprising 30 parts of styrene and 0.3 part of cumene hydroperoxide was continuously added dropwise to the mixture over a period of 120 minutes. After termination of the dropwise addition, the mixture was maintained at the above temperature for 1 hour and then cooled.

The obtained graft copolymer latex was coagulated with dilute sulfuric acid, washed, filtered, and dried.

(4) Preparation of graft copolymers (c-1-II) and (c-1-III)

These copolymers were prepared in the same manner as adopted for the preparation of the copolymer (c-1-I) except that the amounts of the polybutadiene latex and monomers to be grafted were changed as shown in Table 1.

(5) Preparation of graft copolymer (c-2-I)

To 60 parts (as solids) of a polybutadiene latex having a solid content of 33% and an average particle diameter of 0.08 μm was added 2 parts of a copolymer latex having an average particle diameter of 0.08 μm and comprising 85% of n-butyl acrylate units and 15% of methacrylic acid units with stirring, and the mixture was stirred for 30 minutes to obtain an agglomerated rubber latex having an average particle diameter of 0.28 μm. Then 50 parts of distilled water, 2.0 parts of a potassium oleate emulsifier, 0.2 part of a naphthalene-sulfonic acid/formalin condensate (Demol N supplied by Kao), 0.02 part of sodium hydroxide, and 0.35 part of dextrose were added, with stirring, to the obtained agglomerated latex, the temperature was elevated and at an inner temperature of 70° C., 0.05 part of ferrous sulfate, 0.2 part of sodium pyrophosphate, and 0.03 part of sodium dithionite were added to the mixture. Immediately, a liquid mixture comprising 5 parts of 2-vinylpyridine, 15 parts of styrene, and 0.25 part of cumene hydroperoxide was continuously added dropwise to the mixture over a period of 90 minutes. After termination of the dropwise addition, the mixture was maintained at the above temperature for 1 hour and then cooled.

The obtained graft copolymer latex was coagulated with dilute sulfuric acid, washed, filtered, and dried.

(6) Preparation of graft copolymer (c-2-II)

This graft copolymer was prepared in the same manner as adopted for the preparation of the graft copolymer (c-2-I) except that the monomers to be grafted were added in the amounts shown in Table 1 to 70 parts (as solids) of the polybutadiene latex.

(7) Preparation of graft copolymer (c-2-III)

To 50 parts (as solids) of a polybutadiene latex having a solid content of 50% and an average particle diameter of 0.26 μm were added 90 parts of distilled water, 2.0 parts of a potassium oleate emulsifier, 0.2 part of Demol N, 0.02 part of sodium hydroxide, and 0.35 part of dextrose with stirring, the temperature was elevated to 60° C., and at an inner temperature of 60° C., 0.05 part of ferrous sulfate and 0.2 part of sodium pyrophosphate were added to the mixture. Subsequently, a liquid mixture comprising 25 parts of 2-vinylpyridine, 37.5 parts of styrene, and 0.63 part of cumene hydroperoxide was continuously added dropwise to the mixture over a period of 200 minutes, and the mixture was maintained at the above temperature for 1 hour and then cooled. The obtained latex was coagulated with dilute sulfuric acid, washed, filtered, and dried.

(8) Preparation of graft copolymers (c-2-IV) through (c-2-VIII)

These copolymers were prepared in the same manner as adopted for the preparation of the graft copolymer (c-2-I) except that the amounts of the polybutadiene latex and the monomers to be grafted were changed as shown in Table 1.

Examples 1 through 4 and Comparative Examples 1 through 4

The above-mentioned graft copolymers were weighed and mixed at the ratios shown in Table 1, and the mixture was melt-kneaded at a cylinder temperature of 280° C. by using a twin-screw extruder having a screw diameter of 30 mm and pelletized to obtain a composition of the present invention. Test pieces for the evaluation tests were molded from the obtained composition at a cylinder temperature of 270° C. and a mold temperature of 80° C. by an injection molding machine (Yamashiro Injection Molding Machine SAV-30-30A), and these test pieces were evaluated. The results are shown in Table 1.

A (2,6-dimethyl-1,4-phenylene) ether polymer having a reduced viscosity ($\eta sp/c$) of 0.59 dl/g as measured at 25° C. with respect to a 0.1% solution in chloroform by using a Ubbellohde viscometer was used as the polyphenylene ether resin (A).

TABLE 1

| | Example No. | | | | | | | | | | Comparative Example No. | | | | | | | | |
|---|---|---|---|---|---|---|---|---|---|---|---|---|---|---|---|---|---|---|---|
| | 1 | 2 | 3 | 4 | 5 | 6 | 7 | 8 | 9 | 10 | 1 | 2 | 3 | 4 | 5 | 6 | 7 | 8 | 9 |
| A: Polyphenylene ether resin*1 | 30 | 30 | 35 | 40 | 30 | 30 | 20 | 40 | 35 | 30 | 35 | 30 | 25 | 30 | 30 | 30 | 35 | 30 | 38 |
| B: Aromatic vinyl resin*1 | | | | | | | | | | | | | | | | | | | |
| Polystyrene*3 (b-1) | — | — | — | — | — | — | — | — | — | — | — | — | — | — | — | — | — | — | — |
| High-impact polystyrene*4 (b-1) | — | — | 45 | — | — | — | — | — | — | — | — | — | — | — | 70 | — | — | — | — |
| 2VPy (10), St (90) (b-2-I) | 45 | — | — | — | 45 | 50 | 50 | 40 | 50 | 45 | 40 | — | 50 | — | — | 45 | 40 | 45 | 57 |
| 4VPy (20), St (80) (b-2-II) | — | 50 | — | — | — | — | — | — | — | — | — | — | — | — | — | — | — | — | — |
| VI (15), St (85) (b-2-III) | — | — | — | 40 | — | — | — | — | — | — | — | — | — | 50 | — | — | — | — | — |
| AN (25), St (75) (b-2-IV) | — | — | — | — | — | — | — | — | — | — | — | 45 | — | — | — | — | — | — | — |
| C. Graft copolymer*1 | | | | | | | | | | | | | | | | | | | |
| C-1-I    PBd (70) G.m (30) St (30) | 25 | — | — | — | — | — | — | — | — | — | 25 | — | — | — | — | — | — | — | — |
| C-1-II    PBd (70) G.m (30) 1st MMA (15) 2nd St (15) | — | 20 | — | 20 | — | — | — | — | — | — | — | 25 | — | — | — | — | — | — | — |
| C-1-III'    PBd (70) G.m (30) AN (12) St (28) | — | — | — | — | — | — | — | — | — | — | — | — | — | — | — | — | — | — | — |
| C-2-I    PBd (60) G.m (40) 1st 2VPy (5), St (15) 2nd St (20) | — | — | 20 | — | 25 | — | — | — | 15 | — | — | — | 25 | 20 | — | — | — | — | 5 |
| C-2-II    PBd (60) G.m (40) 1st 4VPy (4), St (11) 2nd St (15) | — | — | — | — | — | 20 | — | — | — | — | — | — | — | — | — | — | — | — | — |
| C-2-III    PBd (70) G.m (30) 1st 2VPy (12.5) 2nd St (37.5) | — | — | — | — | — | — | 30 | — | — | — | — | — | — | — | — | — | — | — | — |
| C-2-IV    PBd (50) G.m (50) 1st 2VPy (7.5), St (22.5) 2nd St (10) | — | — | — | — | — | — | — | 20 | — | — | — | — | — | — | — | — | — | — | — |
| C-2-V'    PBd (60) G.m (40) 1st MMA (15) 2nd St (25) | — | — | — | — | — | — | — | — | — | — | — | — | — | — | — | 25 | — | — | — |
| C-2-VI'    PBd (60) G.m (40) AN (12) St (38) | — | — | — | — | — | — | — | — | — | — | — | — | — | — | — | — | 25 | — | — |
| C-2-VII'    PBd (60) G.m (40) 1st AN (5), St (15) 2nd St (20) | — | — | — | — | — | — | — | — | — | — | — | — | — | — | — | — | — | 25 | — |
| C-2-VIII    PBd (60) G.m (40) 1st VI (5), St (15) 2nd St (20) | — | — | — | — | — | — | — | — | — | 25 | — | — | — | — | — | — | — | — | — |
| Physical properties | | | | | | | | | | | | | | | | | | | |
| Izod impact strength (kg · cm/cm) | 10 | 9 | 9 | 10 | 21 | 17 | 18 | 18 | 20 | 15 | 18 | 6 | 4 | 4 | 5 | 17 | 4 | 14 | 3 |
| HDT*5 (°C) | 116 | 116 | 118 | 121 | 116 | 113 | 108 | 120 | 118 | 115 | 118 | 116 | 114 | 115 | 115 | 116 | 118 | 116 | 118 |
| Throwing power at plating step | A | A | A | A | A | A | A | A | A | A | C | A | A | A | C | C | A | B | B |
| Plating adhesion strength (kg/cm) | 1.0 | 0.9 | 0.8 | 0.8 | 1.5 | 1.3 | 1.4 | 1.0 | 1.3 | 1.2 | — | 0.4 | 0.4 | 0.3 | — | — | 0.3 | 0.8 | 0.2 |

Note
*1Numerals within parentheses indicate the amount (parts by weight)
*2Abbreviations
VPy: vinylpyridine
St: styrene
VI: vinylimidazole
AN: acrylonitrile
PBd: polybutadiene
MMA: methyl methacrylate
G.m: grafted monomer
1st: first stage
2nd: second stage
*3Estyene 15 supplied by Nippon Steel Chem.
*4Esblite 50SB supplied by Sumitomo Chem.
*5Heat distortion temperature under a load of 18.6 kg/cm²

We claim:

1. A thermoplastic resin composition comprising (A) 10 to 60 parts by weight of a polyphenylene ether resin, (B) 20 to 70 parts by weight of an aromatic vinyl resin free of a nitrogen-containing heterocyclic compound and (C) 10 to 60 parts by weight of a graft copolymer obtained by polymerizing an aromatic vinyl monomer and a heterocyclic compound having a vinyl group and containing nitrogen as the hetero atom, optionally with at least one ethylenically unsaturated compound selected from the group consisting of methacrylic acid esters, acrylic acid esters, maleimide derivatives and vinyl group-containing nitrogen bases, in the presence of a butadiene based rubbery polymer, wherein the total amount of the components (A), (B) and (C) is 100 parts by weight.

2. A thermoplastic resin composition according to claim 1 wherein the polyphenylene ether resin is a polymer selected from the group consisting of a polymer having recurring units represented by the following general formula:

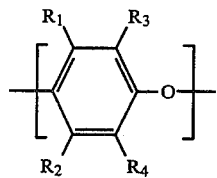

wherein $R_1$, $R_2$, $R_3$ and $R_4$, which may be the same or different, represent an alkyl group having 1 to 4 carbon atoms, excluding a tert.-butyl group, an aryl group having 6 to 10 carbon atoms, a halogen atom, a hydrogen atom, a nitro group or an amino group, and a styrene-grafted polyphenylene ether.

3. A thermoplastic resin composition according to claim 1 wherein the amount of the polyphenylene ether resin (A) is 20 to 45 parts by weight per 100 parts by weight of the sum of the three components (A), (B), and (C).

4. A thermoplastic resin composition according to claim 1 wherein the aromatic vinyl resin (B) is a polymer having recurring units represented by the following formula:

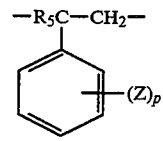

wherein $R_5$ represents a hydrogen atom or an alkyl group having 1 to 4 carbon atoms, Z represents a hydrogen atom, a halogen atom or an alkyl group having 1 to 4 carbon atoms, and p is an integer of from 1 to 5.

5. A thermoplastic resin composition according to claim 1 wherein the amount of the component (B) is 30 to 60 parts by weight per 100 parts by weight of the sum of the three components (A), (B), and (C).

6. A thermoplastic resin composition according to claim 1 wherein the butadiene based rubbery polymer used for the preparation of the graft copolymer (C) is a copolymer of at least 50% by weight of butadiene and not more than 50% by weight of an ethylenically unsaturated monomer or an organosiloxane.

7. A thermoplastic resin composition according to claim 1 wherein the amount of the butadiene based rubbery polymer is at least 30% by weight based on the weight of the graft copolymer (C).

8. A thermoplastic resin composition according to claim 1 wherein the aromatic vinyl monomer used for the preparation of the graft copolymer (C) is represented by the formula:

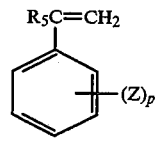

wherein $R_5$ represents a hydrogen atom or an alkyl group having 1 to 4 carbon atoms, Z represents a hydrogen atom, a halogen atom or an alkyl group having 1 to 4 carbon atoms, and p is an integer of from 1 to 5.

9. A thermoplastic resin composition according to claim 1 wherein the amounts of the aromatic vinyl monomer and the heterocyclic compound used for the preparation of the graft copolymer (C) are 30 to 90% by weight and 10 to 50% by weight, respectively, based on the total amount of the monomers to be grafted onto the butadiene based rubbery polymer.

10. A thermoplastic resin composition according to claim 9 wherein the graft copolymer (C) is obtained by polymerizing first the heterocyclic compound and then the aromatic vinyl monomer.

11. A thermoplastic resin composition according to claim 1 wherein the amount of the graft copolymer (C) is 15 to 50 parts by weight per 100 parts by weight of the sum of the three components (A), (B), and (C).

* * * * *

UNITED STATES PATENT AND TRADEMARK OFFICE
CERTIFICATE OF CORRECTION

PATENT NO.  : 5,346,952
DATED       : September 13, 1994
INVENTOR(S) : HONGO et al.

It is certified that error appears in the above-identified patent and that said Letters Patent is hereby corrected as shown below:

On the cover page, Item [63], line 1, "Feb. 20, 1993" should read -- Feb. 20, 1992 --.

Signed and Sealed this

Eighteenth Day of April, 1995

Attest:

BRUCE LEHMAN

Attesting Officer       Commissioner of Patents and Trademarks